July 25, 1939.  O. KREMMLING  2,167,388
BISCUIT MOLDING MACHINE
Filed July 22, 1935
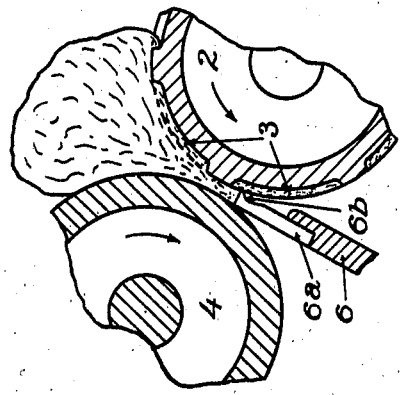
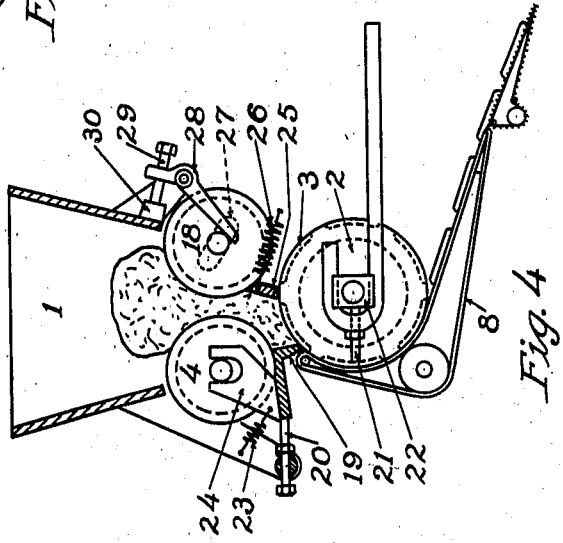
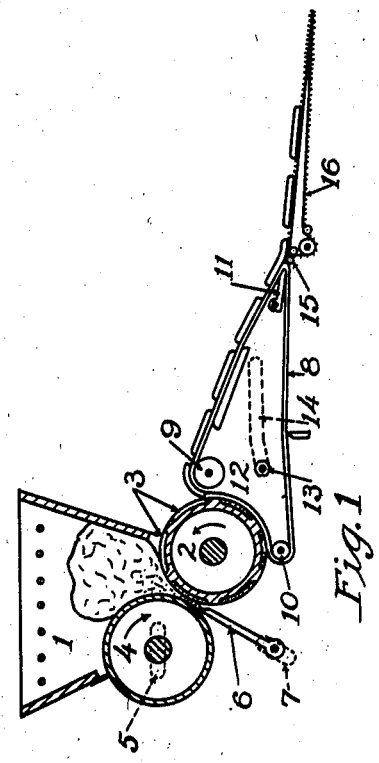
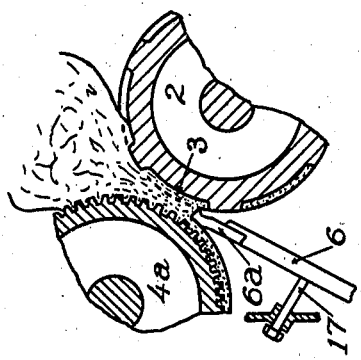
INVENTOR
OTTO KREMMLING
BY
George B. Willcox
ATTORNEY

UNITED STATES PATENT OFFICE 2,167,388

BISCUIT MOLDING MACHINE

Otto Kremmling, Hamersleben, Germany

Application July 22, 1935, Serial No. 32,505
In Germany July 26, 1934

8 Claims. (Cl. 107—8)

This invention relates to machines for feeding dough or other plastic material into molds or forms carried by a rotary molding drum, for the manufacture of biscuits and similar molded or embossed articles, removing excess material from the surface of the drum, and removing the molded pieces from the molds. It has to do more particularly with biscuit molding machines in which dough is fed between a rotating forcing roll and a molding drum to force dough under pressure into the pockets or molds of the drum.

In machines of this general type heretofore employed a stationary or reciprocatory scraper blade or knife-edge has been employed to sever the pieces in the filled molds from the dough mass flush with the face of the molding drum, and to scrape from the molding drum the excess dough adhering to it. In these earlier machines it has been impossible to press the dough firmly into the molds so as to fill them completely and produce a sharply embossed biscuit. The sharp edge of the cut-off blade used tended to lift the dough from the mold pockets and to permit the dough under pressure to flow past it from between the drum and the co-operating feed roll, thus preventing enough pressure in the dough to fill the mold patterns completely. Also, when a reciprocatory knife was used, its friction on the molded pieces tended to withdraw them partly from the molds, and caused them to flow within the molds and produce distorted biscuits.

Furthermore, these relatively thin and incompletely molded pieces were difficult to remove from the molds by the usual means, that is, a belt or band passing about a portion of the face of the molding drum and designed to adhere to the molded pieces to pick them from the mold pockets. In order to overcome this difficulty and to emboss completely the dough pieces in inadequately filled molds it has been necessary to use a rubber roll in conjunction with the take-off belt to press the belt against the face of the molding drum and into the molds in order to complete the embossing. This practice materially reduced the life of the belts and undesirably worked the dough in the molds. That is, the dough in a mold was caused to flow from one end of the mold to the other circumferentially of the molding drum. Such working of the dough is detrimental to its baking qualities and results in distortion of the finished biscuit, some of the dough being squeezed out of the rear of the mold between the take-off belt and the drum, forming a thin "tail" at the bottom edge of the biscuit.

It is an object of my invention to provide a biscuit-molding machine free from all of the above described disadvantages, which will completely fill the molds of the molding drum under positive pressure so as to emboss the pieces clearly and render the molded biscuits easy to remove, without working the dough in the molds, or distorting the finished biscuits.

Another object is to provide means for easily and positively adjusting the pressure at which material is fed to the molds of the molding drum, to enable a wide variety of doughs to be handled successfully.

A further object of my invention is to produce a simpler, more economically built and easily maintained machine by eliminating the need for any special means for pressing the biscuit take-off belt against the molding drum and thus also lengthening the life of the take-off belt.

The invention attains these objects by providing an improved scraper in co-operation with the feeding or forcing roll and the parallel molding drum for removing the excess dough from the molding drum as the molds are filled. This improved scraper differs from the knife-edge heretofore employed in that its end section is blunt, presenting two scraping edges, and is thick enough substantially to fill the space between the forcing roll and the peripheral surface of the molding drum, defining with the faces of the above-mentioned roll and drum a chamber into which the rotating roll and drum force the dough. By thus closing the gap between the surfaces of the roll and drum my novel scraper permits a high degree of pressure to be brought upon the dough in the mold just before it passes under the scraper, so that the dough is embossed sharply by the mold pattern and the mold is filled completely before the edge of the scraper removes the excess dough flush with the face of the drum.

My invention also permits variable adjustment of the pressure at which dough is fed to the molds. This may be effected by varying the speed at which the forcing roll and molding drum are driven, by adjusting the clearance between them, or in other ways. Thus a wide variety of doughs of different consistencies may be handled successfully by the machine.

Other features and objects of the invention appear during the course of the following description:

In the accompanying drawing forming a part of this specification,

Fig. 1 is a diagrammatic sectional side elevation of a biscuit molding machine embodying the invention.

Fig. 2 is an enlarged fragmentary section of the forcing roll, molding drum, and scraper of Fig. 1.

Fig. 3 is a fragmentary sectional side view, showing a modification of the structure of Figs. 1 and 2.

Fig. 4 shows a modification of the invention in which two forcing rolls feed dough onto the surfaces of a molding drum, and in which the clearance between the forcing rolls is adjustable to permit varying the pressure under which dough is fed to the molds of the drum.

Referring to Figs. 1 and 2, a typical biscuit molding machine embodying my invention comprises a supply hopper 1, and a molding drum 2, of known form, having in its peripheral surface molding pockets 3. Drum 2 is positioned below and partly closes the outlet of hopper 1 to receive dough therefrom. It is rotatably mounted in bearings and provided with driving means of known form, not shown. Also mounted below and within the outlet of the hopper 1 is a feeding or forcing roll 4 mounted with its axis parallel to that of the molding drum 2 and adjustable to and away from the drum in journal blocks slidable in slots 5 in the machine frame, not shown. Below the axes of, and between the rolls 2 and 4 is a scraper 6 adjustably mounted in a slot 7 for movement toward or away from the plane of the axes of rolls 2 and 4. The end of the scraper 6 is blunt and of considerable thickness, so that its two edges may contact the surfaces of both drum 2 and roll 4, completely closing the passage between them.

Enveloping a part of the periphery of the molding drum 2 is an endless take-off belt 8, which passes around rolls 9 and 10, and at its discharge point passes at an acute angle over a knife edge 11. A unitary take-off belt assembly comprises the driving roll 9, idler roll 10, and the knife edge 11, which are mounted in spaced parallel side frames 12 rigidly connected together. This entire assembly is removably mounted in the frame of the machine, by a bolt 13 which is adjustably secured in slots 14 in the sides of the machine frame. Thus the side frames 12 carrying the rolls, knife edge, and take-off belt can be moved as a unit to the right for easy replacement or cleaning of the molding roll 2, and for easy repair or replacement of the take-off belt 8.

At the discharge point of the take-off belt, where it passes over the knife edge 11, a revolving rod 15 frees the biscuits and discharges them onto a wire mesh conveyor 16 of known type, which carries the molded pieces away for deposit on baking pans or steel band conveyors of an oven (not shown). This feature is the subject matter of my application for United States Letters Patent, Serial No. 248,916, filed January 3, 1939.

Fig. 2 shows in greater detail the construction of the scraper 6 and its co-operative relation to the molding drum 2 and forcing roll 4. The adjustable scraper 6 is provided at its working end with a blade 6a, which is removable for substitution of scrapers of different thicknesses and shapes required with doughs of various kinds and consistencies. The scraper blade 6a is of substantial thickness, and its working end is substantially rectangular in projection. The edge 6b of the blade which lies in contact with the face of the molding drum 2, is cut away or relieved immediately behind the edge, in order to prevent an accumulation of scrap dough which might adhere to the blade and interfere with its proper operation. The rectangular end surface of the blade closes the passage between the rolls 2 and 4 and opposes the pressure of the dough squeezed between the rolls so that it is forced into the molds 3 of the molding roll. By adjusting the position of the scraper 6 relative to that point at which the surfaces of the rolls are closest, the pressure on the dough may be varied. For instance, if scraper 6 is positioned close to the plane of the axes of the rolls, there will be less pressure on the dough, as less surface area of the drum and roll will frictionally engage the dough coming from the hopper 1. With the scraper 6 farther away from the aforesaid plane, the pressure on the dough will be greater, since the rolls will grip it more effectively.

In operation, the molding drum 2 and roll 4 of Figs. 1 and 2 turn toward each other in the direction indicated by the arrows, urging the dough between their surfaces and filling the mold pockets 3. As the filled molds pass under the scraper edge 6b the excess dough is scraped from the molds flush with the face of the molding drum, and the filled molds are carried into engagement with the take-off belt 8. Belt 8 adheres to the bottoms of the pieces in the molds 3, and as the surfaces of the belt and drum separate at roller 9, the pieces are picked out of the mold pockets and are carried down and discharged onto conveyor 16.

Fig. 3 shows a serrated forcing roll 4a instead of the smooth roll shown in Figs. 1 and 2. In this case the roll 4a and the drum 2 are so spaced that the scraper blade 6a touches only the circumference of the molding drum 2, and its opposite edge has been beveled slightly to be parallel with the surface of the forcing roll 4a. It is shown spaced therefrom slightly, so that a layer of dough remains on the forcing roll. With this adjustment of the blade and roll 4a the maximum pressure on the dough in the molds 3 will be less than in the machines of Figs. 1 and 2, as is desirable with certain soft tender doughs. In order to hold the scraper 6a in contact with the molding drum 2, a pressure screw 17 has been provided bearing on the scraper carrier 6.

Fig. 4 shows a dough hopper 1, below which a forcing roll is mounted in co-operative relation with an additional forcing roll 18. A molding drum 2 is positioned below the two forcing rolls and acts with forcing roll 4 substantially as in the machine of Figs. 1 and 3. A scraper 19 according to the invention closes the passage between the surfaces of rolls 4 and 2 and scrapes excess dough from the filled molds 3 and the surface of the molding drum. Scraper 19 is mounted on the machine for adjustment to and away from the roll 4 and drum 2 by means of a screw 20. When the scraper 19 is moved to the right to decrease the size of the compression chamber between the rolls 2, 4, and 18, the molding drum 4 is also moved to the right by means of an adjusting screw 21 carrying the bearing journals 22 for the axis of the drum. Thus the lower edge of scraper 19 is always in contact with the circumference of the forcing roll 4. A tension spring 23 connecting the scraper 19 with the journal mounting 24 of forcing roll 4 holds the scraper always in proper position. A plate 25 between the other forcing roll 18 and the molding drum 2 closes the opposite side of the compression chamber. The plate 25 is pivotally mounted at its lower edge and touches here the circumference of the molding drum. Its upper edge engages the circumference of forcing roll 18 and is held in this position by means of a tension spring 26. The spacing of the forcing rolls 4 and 18 can be adjusted by laterally shifting roll 18, which is journaled in slotted bearing guides 27, and is adjustably held therein by means of a bell crank lever 28, which carries a set screw 29 engaging a stop 30 on the stationary hopper 1. A take-off belt 8 envelopes a part of the periphery of the molding drum 2, and is driven and operates similarly to that described above.

The machine of Fig. 4 just described affords a wider range of pressure upon the dough being worked than does the machine shown in Fig. 1, as the spacing of the two forcing rolls may be adjusted in addition to varying the size of the compression chamber by shifting the location of scraper element 19.

In each of the various combinations described, the provision of the novel scraper for the mold-carrying drum, having a blunt end of substantial thickness acting as a barrier to prevent or retard the squeezing of plastic material past the molds being filled, insures complete filling of the molds under any desired pressure. Thus cleanly embossed, undistorted biscuits can be made from a wide variety of doughs. Complete filling of the molds eliminates the need for pressure rolls or other means for pressing the take-off belt into the mold-recesses to engage and further emboss biscuits in inadequately filled molds. Undesirable working of the dough, distortion, and the formation of "tails" on the biscuits are thus avoided.

Also, the greater mechanical simplicity of the apparatus for removing the biscuits from the molding drum makes possible the construction of the take-off belt and its driving and idler rollers in a single unit easily adjustable and removable from the molding machine frame as described.

While I have described in some detail specific embodiments of my invention which I deem to be new and advantageous, it is to be understood that the invention is not limited to the exact details of construction shown, as changes may be made therein without departing from the scope of the following claims.

Having thus described my invention, what I claim and desire to secure by Letters Patent is:

1. In a machine for molding biscuits and the like from plastic material, comprising a forcing roll and a molding drum having molds recessed into its peripheral surface, said roll and drum mounted on parallel axes with their adjacent surfaces spaced apart, and adapted for rotation toward each other to receive material and press it between them into the molds of said drum, in combination, a scraper of substantial thickness having its scraping end cut off to present two parallel scraping edges and positioned between said roll and drum, one of said edges lying in scraping relation to the face of the molding drum and the other lying adjacent the face of said forcing roll, whereby the end of said scraper opposes passage of plastic material and increases the pressure urging said material into said molds.

2. Apparatus as claimed in claim 1 wherein the scraper is mounted for adjustment to and away from the plane of the axes of said forcing roll and molding drum, and said roll and drum are relatively adjustable to change the spacing of their adjacent surfaces, whereby the volume of the chamber bounded by the faces of said drum, roll, and the end of said scraper may be varied.

3. A scraper for a machine as claimed in claim 1 having its end cut off to present two scraping edges, wherein the face of the scraper is recessed just behind that edge which lies in scraping relation to the surface of the molding drum.

4. A machine for molding biscuits and the like from plastic material comprising in combination a spaced pair of forcing rolls mounted on parallel axes for rotation toward each other to feed material between them, a rotatable drum having molds in its peripheral surface and positioned below said forcing rolls to receive material from them, a stationary plate closing the gap between one of said rolls and said drum, and an abutment member closing the gap between the other of said rolls and said molding drum, that edge of said abutment member in contact with the peripheral surface of said drum adapted and arranged to scrape therefrom and from the filled molds therein all excess material.

5. A machine as claimed in claim 4, wherein said forcing rolls are relatively adjustable to vary the gap between their peripheral surfaces, and accordingly alter the pressure at which they feed material into the molds of the molding drum.

6. In a machine for molding biscuits and the like from plastic material comprising a forcing roll and a molding drum having molds recessed into its peripheral surface, said roll and drum mounted on parallel axes with their adjacent surfaces spaced apart and adapted for rotation toward each other to receive material and press it between them into the molds of said drum, in combination, scraping means between said roll and drum presenting a barrier to the flow of plastic material from between them and having two parallel scraping edges lying one in scraping relation to the periphery of said roll, the other in scraping relation to the periphery of said drum.

7. Apparatus as claimed in claim 6 wherein the scraping means is mounted for adjustment to and away from the plane of the axes of said forcing roll and molding drum, and said roll and drum are relatively adjustable to change the spacing of their adjacent surfaces, whereby the volume of the chamber bounded by said scraping means and the faces of said drum and roller may be adjusted.

8. Scraping means as claimed in claim 6, wherein the body of the scraping means is formed or recessed to provide a relief immediately behind that scraping edge which lies in scraping relation to the periphery of the molding drum.

OTTO KREMMLING.